(12) United States Patent
Koyama et al.

(10) Patent No.: US 11,754,709 B2
(45) Date of Patent: Sep. 12, 2023

(54) OBJECT DETECTION DEVICE

(71) Applicant: DENSO CORPORATION, Kariya (JP)

(72) Inventors: Yu Koyama, Nisshin (JP); Mitsuyasu Matsuura, Nisshin (JP); Satoru Noro, Kariya (JP); Hideki Otsuka, Kariya (JP); Tetsuya Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 17/220,423

(22) Filed: Apr. 1, 2021

(65) Prior Publication Data
US 2021/0223394 A1    Jul. 22, 2021

Related U.S. Application Data

(63) Continuation of application No. PCT/JP2019/036350, filed on Sep. 17, 2019.

(30) Foreign Application Priority Data

Oct. 3, 2018 (JP) ................................ 2018-188466

(51) Int. Cl.
*G01S 15/88* (2006.01)
*G01S 15/931* (2020.01)
(Continued)

(52) U.S. Cl.
CPC ............ *G01S 15/931* (2013.01); *G01S 7/524* (2013.01); *G01S 7/526* (2013.01)

(58) Field of Classification Search
CPC ......... G01S 15/931; G01S 7/524; G01S 7/526
See application file for complete search history.

(56) References Cited

U.S. PATENT DOCUMENTS 8,989,753 B2 * 3/2015 Aunkofer .......... H04W 52/0229
  455/450
2004/0218471 A1 * 11/2004 Bahr ..................... G01S 15/931
  367/99
(Continued)

FOREIGN PATENT DOCUMENTS

DE       10106142 A1    8/2002
EP         1231481 A2 *  8/2002   ........... G01S 15/104
(Continued)

OTHER PUBLICATIONS

JP-2018185168-A (Machine Translation) (Year: 2018).*
KR-20050032583-A (Machine Translation) (Year: 2005).*
EP-1231481-A2 (Machine Translation) (Year: 2002).*

*Primary Examiner* — Yuqing Xiao
*Assistant Examiner* — Christopher Richard Walker
(74) *Attorney, Agent, or Firm* — MASCHOFF BRENNAN (57) ABSTRACT

An object detection device includes a signal generator configured to generate a drive signal including an identification signal for identifying ultrasonic waves, a transmitter configured to transmit an ultrasonic wave as a probe wave in response to the drive signal, a receiver configured to receive the ultrasonic wave to generate a reception signal, and a determiner configured to analyze frequencies of the reception signal to determine whether the received wave is a reflected wave of the probe wave, thereby detecting an object. The drive signal includes a ramp-up signal generated to be followed by the identification signal and is used to ramp up an amplitude of the probe wave. A frequency of the ramp-up signal is set to include a frequency at which a transmission/reception efficiency is higher than a transmission/reception efficiency at each of a maximum frequency of the identification signal and a minimum frequency of the identification signal.

9 Claims, 9 Drawing Sheets

(51) Int. Cl.
  *G01S 7/524* (2006.01)
  *G01S 7/526* (2006.01)

(56) References Cited

U.S. PATENT DOCUMENTS

| | | | | |
|---|---|---|---|---|
| 2009/0135672 A1* | 5/2009 | Matsuura | ............... | G01S 15/42 |
| | | | | 367/100 |
| 2009/0268553 A1* | 10/2009 | Ecker | ..................... | G01S 7/003 |
| | | | | 367/119 |
| 2020/0049816 A1 | 2/2020 | Suzuki et al. | | |

FOREIGN PATENT DOCUMENTS

| | | | | | |
|---|---|---|---|---|---|
| GB | 2402484 A | * | 12/2004 | ........... | B06B 1/0223 |
| JP | H06-003447 A | | 1/1994 | | |
| JP | 2018-179676 A | | 11/2018 | | |
| JP | 2018185168 A | * | 11/2018 | ............. | G01S 15/87 |
| JP | 2019-066383 A | | 4/2019 | | |
| KR | 20050032583 A | * | 4/2005 | | |
| WO | 2018/190237 A1 | | 10/2018 | | |

\* cited by examiner

OBJECT DETECTION DEVICE

CROSS REFERENCE TO RELATED APPLICATION

This international application claims the benefit of priority from Japanese Patent Application No. 2018-188466 filed on Oct. 3, 2018, the entire contents of which are incorporated herein by reference.

BACKGROUND

Technical Field

This disclosure relates to an object detection device for detecting an object by transmitting and receiving ultrasonic waves.

Related Art

In cases where such an object detection device is mounted to a vehicle or the like and used for obstacle detection, interference with ultrasonic waves transmitted from another device mounted to the same vehicle or ultrasonic waves transmitted from surrounding vehicles may reduce the object detection accuracy.

DESCRIPTION OF SPECIFIC EMBODIMENTS

As an attempt to prevent interference with ultrasonic waves transmitted from another device, DE-A-101 06 142 proposes a technique for identifying ultrasonic waves by using frequency modulation such that the frequency changes with time. More specifically, a reflected wave of an own transmitted ultrasonic wave is distinguished from ultrasonic waves transmitted from other devices by changing the frequency of the own transmitted wave and determining whether a received wave includes a signal that changes in frequency in the same way as the own transmitted wave.

In order to improve distinguishability from noise and un-modulated signals, it is possible to use a chirp signal or the like whose frequency increases or decreases with time. With use of the chirp signal, the distinguishability is improved as the frequency band is broadened.

However, in cases where a resonant microphone or the like is used as an ultrasonic-wave transceiving element, increasing a bandwidth of ultrasonic waves causes some frequencies of the ultrasonic waves to fall outside of a resonant band of the transceiving element, which may lead to a reduction in the transmission sound pressure and the receiving sensitivity. The reduced transmission sound pressure may lead to a reduced frequency variation width of reflected waves appearing in reception signals, which may lead to a deterioration in the distinguishability between ultrasonic waves.

In view of the foregoing, it is desired to have an object detection device that can improve distinguishability of ultrasonic waves.

One aspect of this disclosure provides an object detection device including: a signal generator configured to generate a drive signal including an identification signal for identifying ultrasonic waves; a transmitter configured to transmit an ultrasonic wave as a probe wave in response to the drive signal; a receiver configured to receive the ultrasonic wave to generate a reception signal; and a determiner configured to analyze frequencies of the reception signal to determine whether the received wave is a reflected wave of the probe wave, thereby detecting an object. In the object detection device, the drive signal includes a ramp-up signal generated to be followed by the identification signal and is used to ramp up an amplitude of the probe wave, and a frequency of the ramp-up signal, $f_T$, is set to include a frequency at which a transmission efficiency of the transmitter is higher than a transmission efficiency of the transmitter at each of a maximum frequency of the identification signal, $f_{MAX}$, and a minimum frequency of the identification signal, $f_{MIN}$, and/or a reception efficiency of the receiver is higher than a reception efficiency of the receiver at each of the maximum frequency of the identification signal, $f_{MAX}$, and the minimum frequency of the identification signal, $f_{MIN}$.

With this configuration, generating the ramp-up signal of high transmission efficiency and high reception efficiency before generating the identification signal can accelerate the rise in the amplitude of the probe wave. This can provide an increased width of frequency variation of the reflected wave that appears in the reception signal when the bandwidth of the probe wave is broadened, which enables enhancement of the identifiability of the ultrasonic waves.

It should be noted that the reference numbers in the parentheses associated with the elements merely show an example of the correspondence in configuration between these elements and specific elements described in connection to the embodiments described later, and they do not limit the technical scope of this disclosure in any way.

Hereinafter, some embodiments of the disclosure will be described with reference to the drawings. In order to facilitate understanding of the description, the same structural elements in the drawings share the same reference signs wherever possible, and overlapping description is omitted.

First Embodiment

Figure 1:
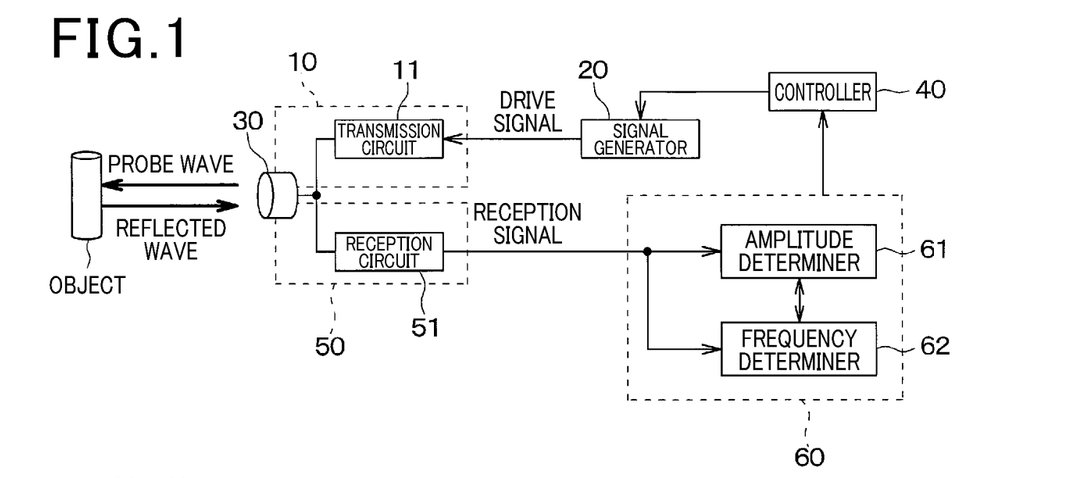
FIG. 1 is a block diagram illustrating a configuration of an object detection device according to a first embodiment.

The first embodiment will be described. As illustrated in FIG. 1, an object detection device of the present embodiment includes a transmitter 10, a signal generator 20, a transceiving element 30, a controller 40, a receiver 50, and a signal determiner 60. The object detection device is an ultrasonic-wave sonar device mounted to a vehicle and configured to detect an object external to the vehicle.

The transmitter 10 transmits ultrasonic waves as probe waves. A drive signal generated by the signal generator 20 is input to the transmitter 10. The transmitter 10 transmits a probe wave in response to this drive signal.

More specifically, the signal generator 20 generates a pulse signal as the drive signal for the transmitter 10. As illustrated in FIG. 1, the transmitter 10 includes a transceiving element 30 and a transmission circuit 11. The drive signal generated by the signal generator 20 is input to the transmission circuit 11. The transmission circuit 11 performs processes, such as a boosting process, on the drive signal received from the signal generator 20 and outputs a thereby-generated signal. The signal output from the transmission circuit 11 is input to the transceiving element 30. The transceiving element 30 transmits a probe wave away from the vehicle in response to the signal received from transmission circuit 11. The transceiving element 30 may be formed of a resonant microphone including, for example, a piezoelectric element.

A transmission command, setting information for the drive signal, and others are transmitted from the controller 40 to the signal generator 20. The controller 40, the signal determiner 60 and the like are configured as a well-known microcomputer including a central processing unit (CPU), a read-only memory (ROM), a random-access memory (RAM), an input-output interface (I/O) and other components, and configured to perform processes corresponding to various operations by executing programs stored in the ROM or the like. The ROM and the RAM are non-transitory tangible storage medium.

The receiver 50 receives an ultrasonic wave and generates a reception signal in response to the sound pressure of the received wave. The receiver 50 includes the transceiving element 30 and a reception circuit 51. The transceiving element 30 is configured to output a voltage corresponding to the sound pressure of the received wave. The reception circuit 51 generates a reception signal by performs processes, such as amplification, filtering and the like, on the voltage output from the transceiving element 30. The reception signal generated by the receiver 50 is input to the signal determiner 60.

The signal determiner 60 analyzes the frequency of the reception signal to determine whether the received wave is a reflected wave of the probe wave transmitted from the transceiving element 30 and further determines whether there is an object in a detection range, thereby detecting an object external to the vehicle. The signal determiner 60 includes an amplitude determiner 61 and a frequency determiner 62. The reception signal generated by the receiver 50 is input to the amplitude determiner 61 and the frequency determiner 62.

The amplitude determiner 61 extracts amplitude information from the reception signal by performing a low-pass filtering process or Hilbert transformation on the square of the reception signal, and determines a distance to the object based on this amplitude information. For example, the amplitude determiner 61 detects a propagation time of the ultrasonic wave from the time when the amplitude of the received wave exceeds a predetermined amplitude threshold and calculates the distance to the object that reflected the probe wave based on this propagation time. The amplitude determiner 61 determines whether the calculated distance is within a predetermined detection range.

The frequency determiner 62 extracts frequency information from the reception signal using zero-crossing detection, FFT, or the like, and determines, based on the frequency information, whether the received wave is a reflected wave of the probe wave transmitted from the transceiving element 30.

The signal generator 20 generates a drive signal that includes an identification signal for identifying ultrasonic waves. For example, the signal generator 20 changes the frequency of the identification signal to a plurality of values. The frequency determiner 62 determines that the received wave is the reflected wave of the probe wave transmitted from the transceiving element 30 when the received wave changes in frequency similar in manner to the identification signal.

The signal determiner 60 detects an object based on processes performed by the amplitude determiner 61 and the frequency determiner 62 and transmits a result of detection to the controller 40. That is, in response to the amplitude determiner 61 determining that the distance to the object is within the detection range and the frequency determiner 62 determining that the received wave is the reflected wave of the probe wave transmitted from the transceiving element 30, the signal determiner 60 transmits to the controller 40 a result of determination that an object has been detected.

The operation of the object detection device will now be described. First, upon the controller 40 transmitting a transmission command to the signal generator 20, the signal generator 20 generates a drive signal. The transmitter 10 transmits a probe wave in response to the drive signal. Upon the probe wave being reflected by an object external to the vehicle, the receiver 50 receives the reflected wave and generates a reception signal. The signal determiner 60 detects the object based on the reception signal and transmits the result of detection to the controller 40. The controller 40 provides a notification to the driver in response to the result of detection.

Figure 2:
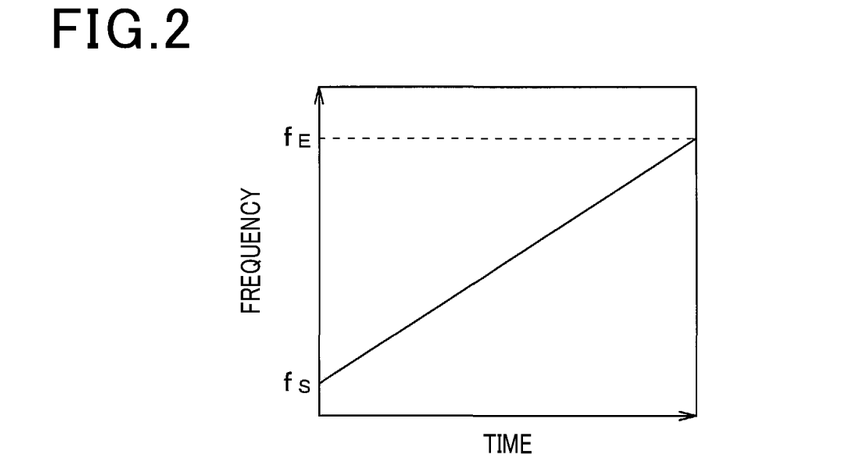
FIG. 2 is an illustration of frequencies of a drive signal in a comparative example.

For example, as illustrated in FIG. 2, it is contemplated to use a signal whose frequency increases with time from the beginning to the end of generation thereof as the drive signal generated by the signal generator 20.

However, low followability of the transceiving element, such as resonant microphone, to the drive signal leads to a small width of frequency variation of the reception signal with respect to frequency change of the drive signal and thus leads to reduced distinguishability of the ultrasonic waves.

The resonant ultrasonic wave transceiving element, such as a microphone or the like, has frequency characteristics similar to a bandpass filter (BPF) and is limited to +/− some percentage of the resonant frequency that enables better transmission and reception. If the frequency at the beginning of generation of the drive signal is set lower than the resonant frequency of the transceiving element 30 in order to efficiently use the resonant band of transceiving element 30, driving of the transceiving element 30 will be started at a less transmission efficient frequency, which will delay the rise in the amplitude of the probe wave. In addition, the transceiving element, such as the resonant microphone, has a low S/N in a band where the amplitude is small, which makes it difficult to control the frequency of the probe wave in a stable manner. Accordingly, the width of frequency variation detected from the reception signal of the reflected wave decreases, which leads to reduced identifiability of the ultrasonic wave.

Figure 3:
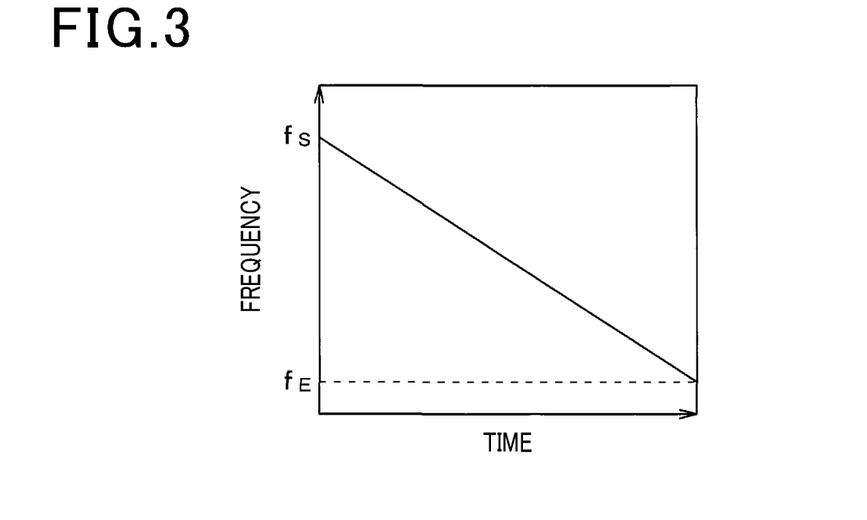
FIG. 3 is an illustration of frequencies of a drive signal in a comparative example.

It is also contemplated to use a signal whose frequency decreases with time from the beginning to the end of generation thereof as the drive signal generated by the signal generator 20, as illustrated in FIG. 3. However, if the frequency at the beginning of generation of the drive signal is set higher than the resonant frequency of the transceiving element 30, the identifiability of the ultrasonic waves will deteriorate also in this case.

As described above, in the transceiving element, such as a resonant microphone, it is difficult to provide stable control of the frequency of the probe wave in a band where the amplitude is small. Nevertheless, externally adding energy to increase the amplitude can facilitate control of the frequency of the probe wave.

In the present embodiment, to accelerate the rise in the amplitude in the transceiving element 30, the drive signal is configured as follows. That is, the drive signal includes a ramp-up signal used to ramp up the amplitude of the probe wave and an identification signal used to identify ultrasonic waves. The identification signal is generated following the ramp-up signal.

Figure 4:
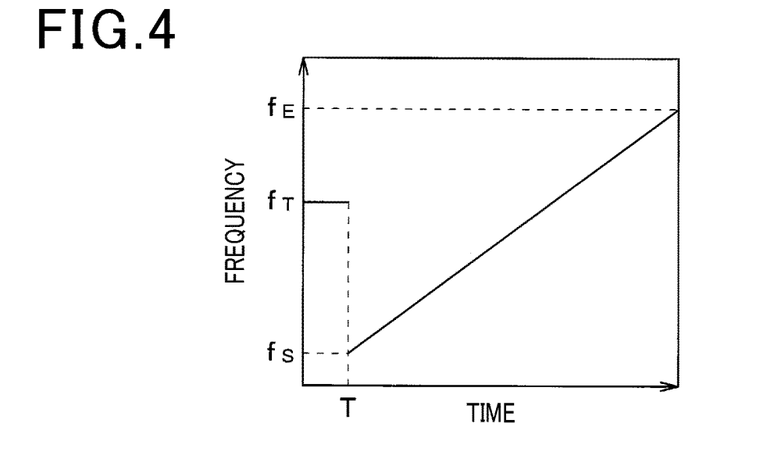
FIG. 4 is an illustration of frequencies of a drive signal according to the first embodiment.
Figure 5:
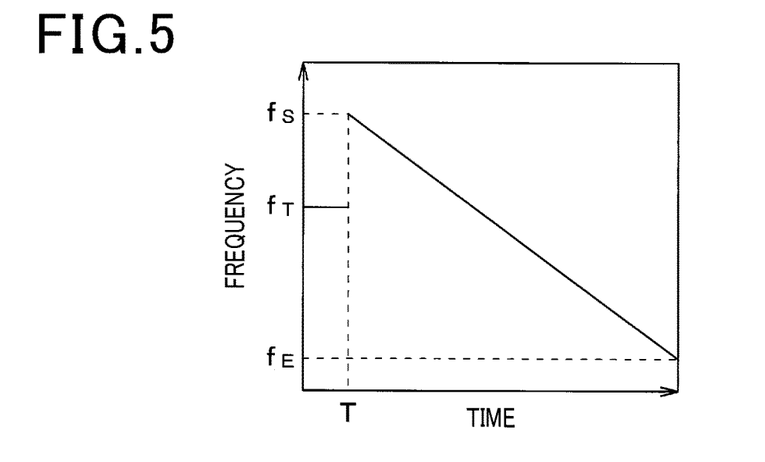
FIG. 5 is an illustration of frequencies of a drive signal according to the first embodiment.

For example, as illustrated in FIG. 4, the signal generator 20 generates a ramp-up signal of a constant frequency and subsequently generates an identification signal whose frequency increases with time. Alternatively, for example, as illustrated in FIG. 5, the signal generator 20 generates a ramp-up signal of a constant frequency and subsequently generates an identification signal whose frequency decreases with time.

The frequency of the ramp-up signal is $f_T$, a time from the beginning to the end of generation of the ramp-up signal is T, and the maximum frequency and the minimum frequency of the identification signal are $f_{MAX}$ and $f_{MIN}$, respectively. The frequency $f_T$ is set to include a frequency at which the transmission efficiency of transmitter 10 is higher than the transmission efficiency of the transmitter 10 at each of the frequencies $f_{MAX}$ and $f_{MIN}$ and/or the reception efficiency of receiver 50 is higher than the reception efficiency of the receiver 50 at each of the frequencies $f_{MAX}$ and $f_{MIN}$. The frequency $f_T$ is stored in the ROM or the like included in the controller 40.

The transmitter 10 and the receiver 50 may match in resonant frequency. However, the transmission efficiency of the transmitter 10 and the reception efficiency of the receiver 50 are affected not only by the characteristics of the transceiving element 30 but also by the characteristics of the transmission circuit 11 and the reception circuit 51, so that the transmitter 10 and the receiver 50 may be different in resonant frequency.

In cases where the resonant frequencies of the transmitter 10 and the receiver 50 match, both the transmission efficiency of the transmitter 10 and the reception efficiency of the receiver 50 are maximized by setting the frequency $f_T$ equal to these resonant frequencies.

In cases where the resonant frequencies of the transmitter 10 and the receiver 50 are different, the frequency $f_T$ may be set based on the characteristics of either the transmitter 10 or the receiver 50. For example, the frequency $f_T$ may be set to $f_{TMAX}$ (i.e., $f_T = f_{TMAX}$), where $f_{TMAX}$ is the resonant frequency of the transmitter 10, that is, a frequency at which the transmission efficiency of the transmitter 10 is maximized, or may be set to a value within +/− some percentage of of the frequency $f_{TMAX}$. Instead, the frequency $f_T$ may be set equal to the resonant frequency of the receiver 50 or may be set to a value within +/− some percentage of the resonant frequency of the receiver 50. The transmission efficiency of transmitter 10 is maximized by setting the frequency $f_T$ equal to the resonant frequency of the transmitter 10. The reception efficiency of the receiver 50 is maximized by setting the frequency $f_T$ equal to the resonant frequency of the receiver 50.

In addition, the characteristics of the transmitter 10 and the receiver 50 are heavily affected by the characteristics, such as a transmission sound pressure, the sensitivity and the like, of the transceiving element 30. Therefore, the frequency $f_T$ may be set to $f_0$, that is $f_T = f_0$, where $f_0$ is the resonant frequency of the transceiving element 30, or may be set to a value near $f_0$, e.g., a value within +/− some percentage of $f_0$. The frequency $f_0$ may directly be measured prior to assembling the transceiving element 30 into the object detection device, or may indirectly be measured from frequencies of echoes that occur after transmission of the probe wave and a circuit constant of the transmission circuit 11. In such a way, setting the frequency $f_T$ adjusted to the individual difference of the transceiving element 30 enables enhancement of the transmission and reception efficiency.

Figure 6:
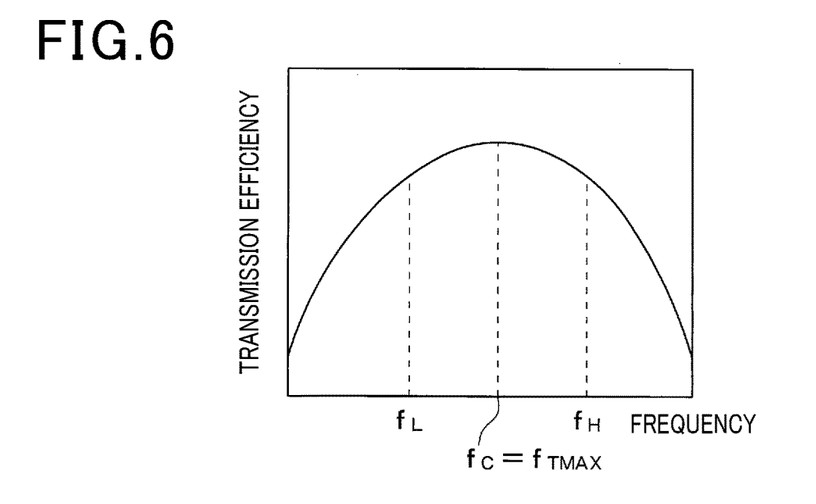
FIG. 6 is an illustration of a relationship between frequency and transmission efficiency of a transceiving element.
Figure 7:
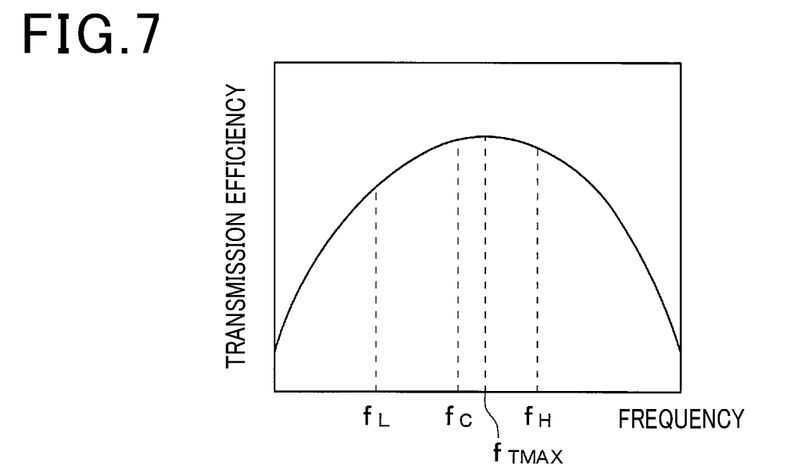
FIG. 7 is an illustration of a relationship between frequency and transmission efficiency of a transceiving element.

As illustrated in FIG. 6, the center frequency $f_C$ of a band of the identification signal may be equal to the resonant frequency $f_{TMAX}$ of the transmitter 10. As illustrated in FIG. 7, the center frequency $f_C$ of the band of the identification signal may be different from the frequency $f_{TMAX}$. Similarly, the frequency $f_C$ may be equal to or different from the resonant frequency of the receiver 50.

A frequency of the identification signal at the beginning of generation thereof is denoted by $f_S$, and a frequency of the identification signal at the end of generation thereof is denoted by $f_E$. In the example of FIG. 4, $f_S = f_{MIN}$, $f_E = f_{MAX}$, and $f_S < f_T < f_E$. In the example of FIG. 5, $f_S = f_{MAX}$, $f_E = f_{MIN}$, and $f_E < f_T < f_S$.

Figure 8:
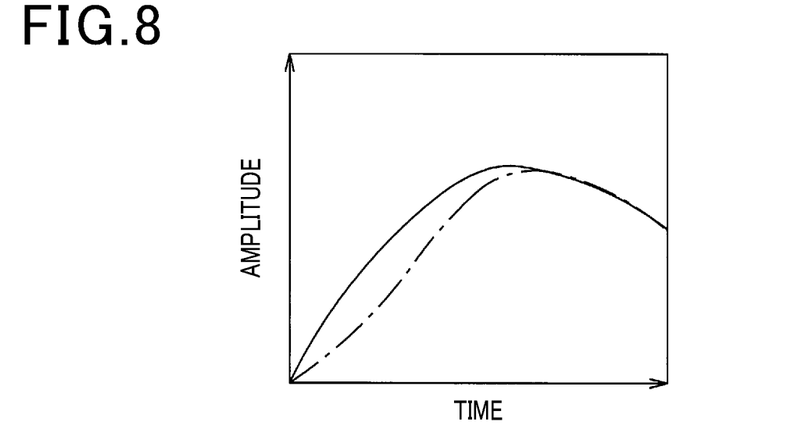
FIG. 8 is an illustration of amplitudes of received waves.
Figure 9:
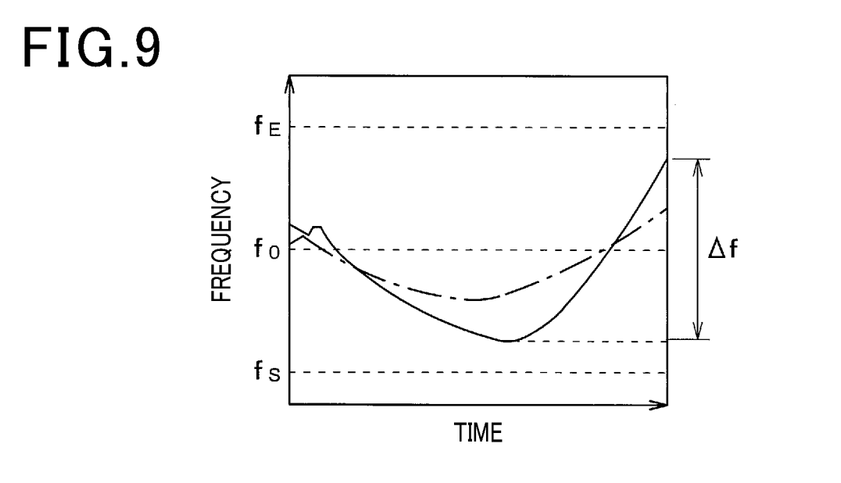
FIG. 9 is an illustration of frequencies of received waves.

Using such a drive signal can accelerate the rise in the amplitude of the probe wave, as illustrated in FIG. 8. This leads to a broadened transmission frequency band having an efficient S/N. As illustrated in FIG. 9, the width of frequency variation $\Delta f$ detected from the reception signal increases, which improves the identifiability of the ultrasonic waves. In FIG. 8, the solid line indicates the frequency of the received wave when the drive signal illustrated in FIG. 4 is used, and the dashed-dotted line indicates the frequency of the received wave when the drive signal illustrated in FIG. 2 is used.

As described above, in the present embodiment, driving the transceiving element 30 with a ramp-up signal of a transmission and reception efficient frequency provides an accelerated rise in the amplitude of the probe wave and a larger width of frequency variation of the reflected wave appearing in the reception signal, which increases the ultrasonic-wave distinguishability.

In cases where a drive signal as illustrated in FIG. 2 or 3 is used, a method may be envisaged for increasing the width of frequency variation Δf after completion of the rise in the amplitude of the probe wave by increasing the signal length or duration of the drive signal and providing gradual changes in frequency. However, as the signal length of the drive signal is increased, an overlap between a plurality of reflected waves is more likely to occur and the distinguishability and the distance measurement resolution of ultrasonic waves may degrade. Energy required for transmission also increases.

Figure 10:
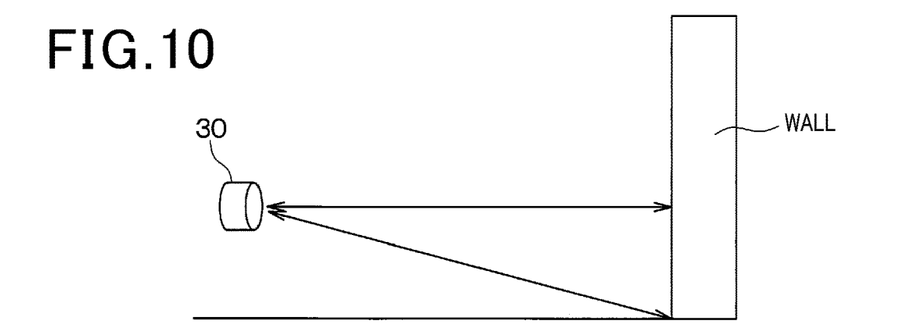
FIG. 10 is an illustration of propagation paths when a probe wave is reflected on a wall.
Figure 11:
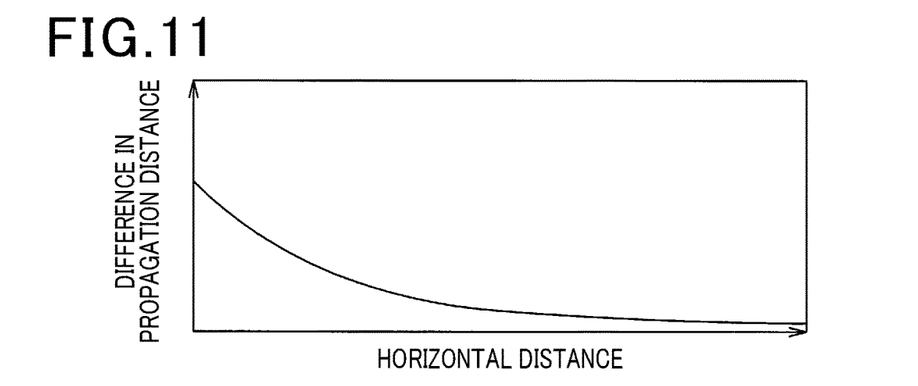
FIG. 11 is an illustration of differences in propagation distance between propagation paths.

For example, when a probe wave is transmitted toward a wall as illustrated in FIG. 10, a superposition of the reflected wave from a front portion of the wall facing the transceiving element 30 and the reflected wave from the base of the wall may be received. As illustrated in FIG. 11, as the horizontal distance from the transceiving element 30 increases, the difference in propagation distance between these reflected waves decreases and these reflected waves are more likely to overlap.

Figure 12:
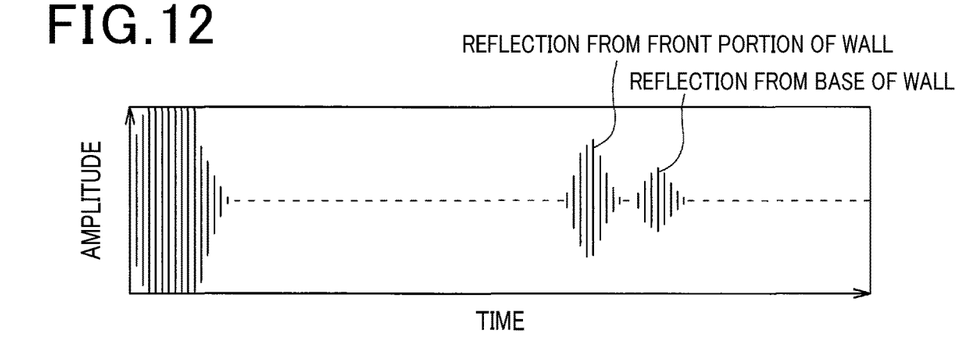
FIG. 12 is an illustration of amplitudes of two received waves separated by an interval of time.
Figure 13:
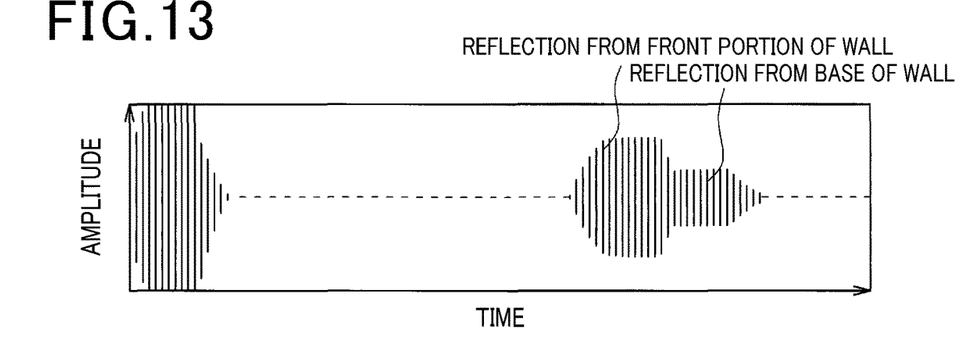
FIG. 13 is an illustration of amplitudes of two received waves overlapping each other.

In cases where two reflected waves are received separately from each other as illustrated in FIG. 12, their respective amplitudes and frequencies may readily be detected. In cases where the two reflected waves are received overlapping each other as shown in FIG. 13, it may be difficult to detect their respective amplitudes and frequencies.

Therefore, in order to inhibit overlapping of reflected waves when detecting an object like a wall, it is desirable to decrease the signal length of the drive signal. From the viewpoint of transmission energy as well, it is desirable to decrease the signal length of the drive signal.

To this end, in the present embodiment, accelerating the rise in the amplitude of the probe wave using the ramp-up signal allows the distinguishability of the ultrasonic waves to be retained even with reduced signal length of the drive signal, which can inhibit overlapping of the reflected waves.

Using the resonant microphone as the transceiving element 30 and using the drive signal illustrated in FIG. 4 to drive the transceiving element 30 will lead to a V-shaped variation in the frequency of the received wave as illustrated in FIG. 9. Instead, using the drive signal illustrated in FIG. 5 to drive the transceiving element 30 will lead to an inverted V-shaped variation in the frequency of the received wave.

Although detection of such a V-shaped variation enables enhancement of the distinguishability of the ultrasonic waves, the drive signals illustrated in FIGS. 2 and 3 may not provide the V-shaped variation depending on the condition of the transceiving element 30 before receipt of the reflected wave. In contrast, in the present embodiment, the ramp-up signal is used to drive the transceiving element 30 near the resonant frequency, such that a V-shaped variation is more likely to appear. This enables enhancement of the distinguishability of the ultrasonic waves.

Second Embodiment

A second embodiment will be now described. The present embodiment is different from the first embodiment only in that a temperature measurer is added. The other elements are similar as in the first embodiment. Thus, only differences from the first embodiment are described.

Figure 14:
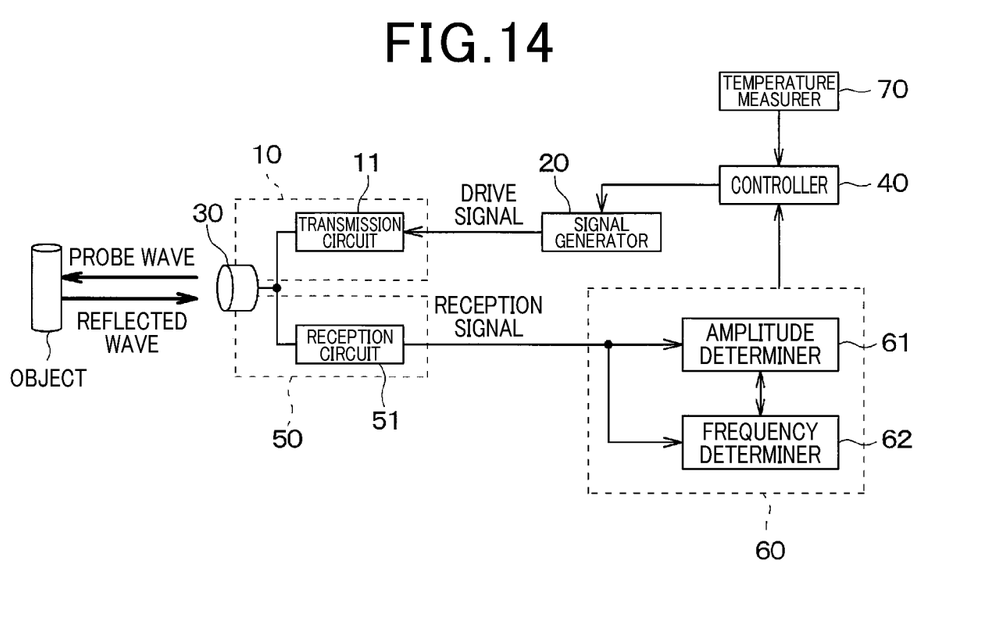
FIG. 14 is a block diagram illustrating a configuration of an object detection device according to a second embodiment.

As illustrated in FIG. 14, the object detection device of the present embodiment further includes a temperature measurer 70. The temperature measurer 70 is provided to measure an environmental temperature. The environmental temperature measured by the temperature measurer 70 is transmitted to the controller 40. The controller 40 changes either or both of the length and the frequency $f_T$ of the ramp-up signal in response to changes in the environmental temperature.

Figure 15:
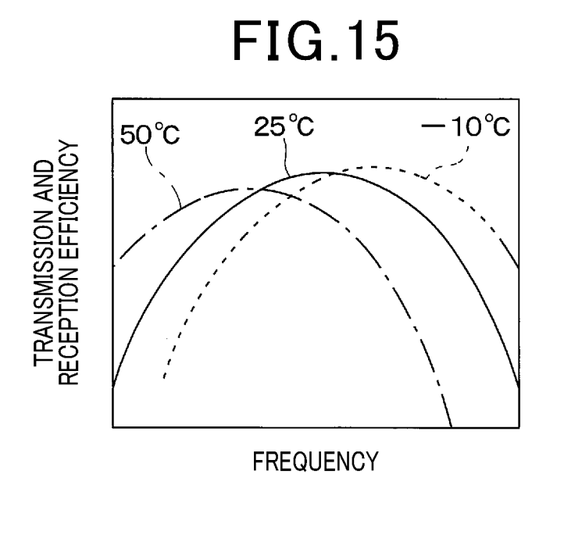
FIG. 15 is an illustration of a relationship between temperature and transmission and reception efficiency.

The resonant frequency and the resonant band of the transceiving element 30 vary with temperature. For example, as illustrated in FIG. 15, the lower the temperature, the higher the resonant frequency, and the higher the temperature, the lower the resonant frequency. The amplitude and the receiving sensitivity of the probe wave may thus vary with such characteristics variations, which may cause degradation of the accuracy of object determination.

The effects of temperature variations can be reduced and the accuracy of object determination can be improved by correcting the frequency $f_T$ and the length of the ramp-up signal in response to the environmental temperature.

Modifications

This disclosure is not limited to the embodiments set forth above. Various changes and modifications can be made as appropriate.

Figure 16:
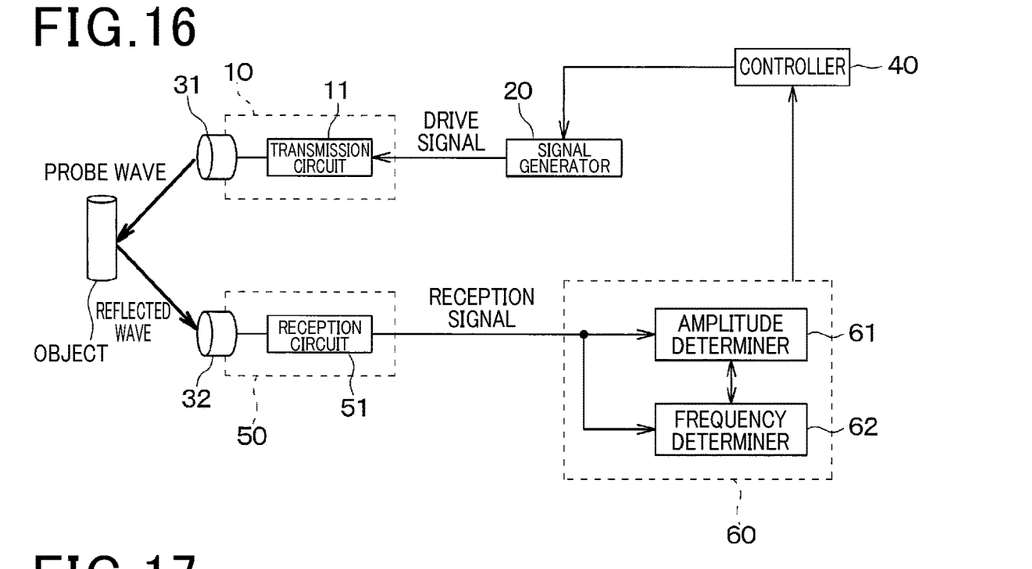
FIG. 16 is a block diagram illustrating a configuration of an object detection device according to another embodiment.

For example, as illustrated in FIG. 16, the object detection device may include a transmission element 31 and a reception element 32. The transmitter 10 may be formed of the transmission element 31 and the transmission circuit 11. The receiver 50 may be formed of the reception element 32 and the reception circuit 51.

Figure 17:
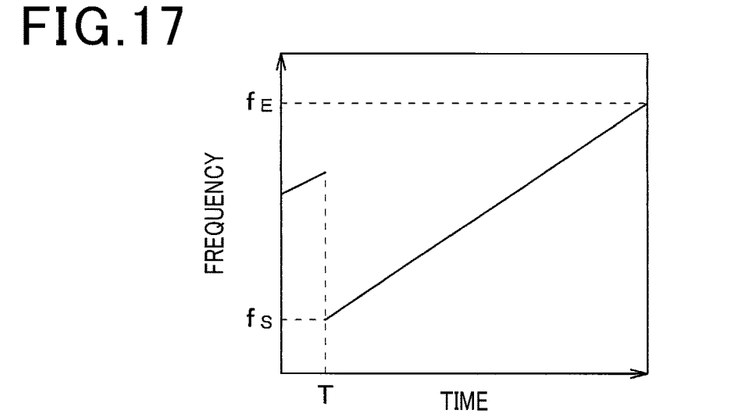
FIG. 17 is an illustration of frequencies of a drive signal according to another embodiment.
Figure 18:
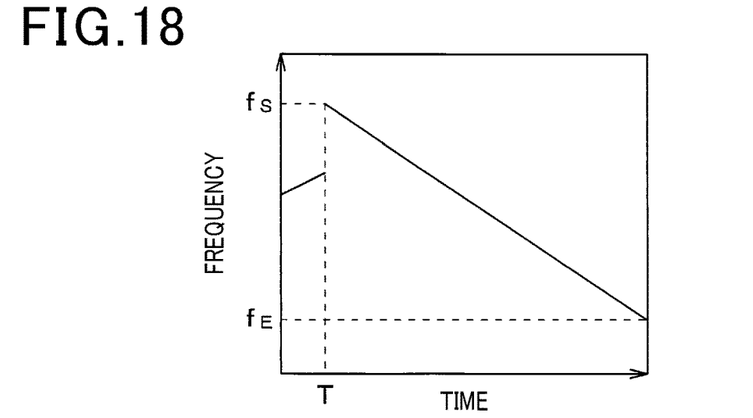
FIG. 18 is an illustration of frequencies of a drive signal according to another embodiment.
Figure 19:
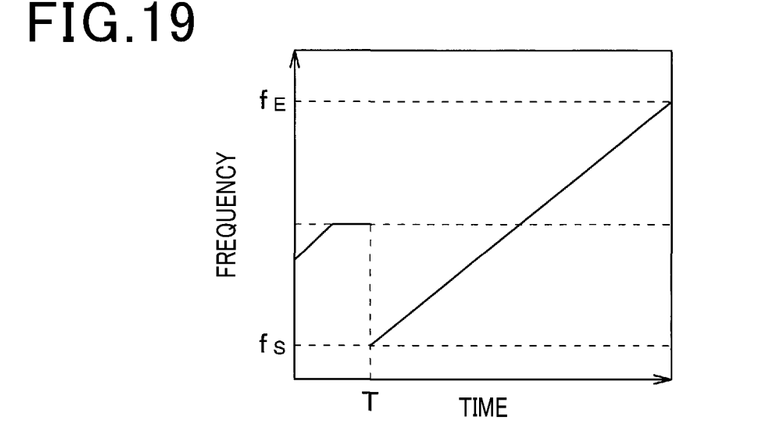
FIG. 19 is an illustration of frequencies of a drive signal according to another embodiment.

As illustrated in FIGS. 4 and 5, setting the frequency $f_T$ of the ramp-up signal constant from the beginning to the end of generation of the ramp-up signal provides an efficient rise in the amplitude of the probe wave. Alternatively, the frequency $f_T$ may be varied. For example, as illustrated in FIGS. 17 and 18, the frequency $f_T$ may be increased with time. As illustrated in FIG. 19, the frequency $f_T$ may be constant after being increased with time. In this case, the initial frequency $f_T$ may be set to a value away from the resonant frequency of each of the transmitter 10 or the receiver 50, and may be constant near the resonant frequency.

The frequency $f_T$ may be determined depending on the characteristics, such as the maximum amplitude, the frequency band or the like, of the identification signal. For example, a large difference between the frequency $f_T$ and the frequency $f_S$ may cause a delay in transition from the frequency $f_T$ to the frequency $f_S$ at the beginning of driving of the transceiving element 30 by the identification signal and may thus lead to a small width of frequency variation of the probe wave. In such a case, the width of frequency variation of the probe wave may be increased by shifting the frequency $f_T$ toward the frequency $f_S$ to an extent such that the reception efficiency does not excessively decrease.

Figure 20:
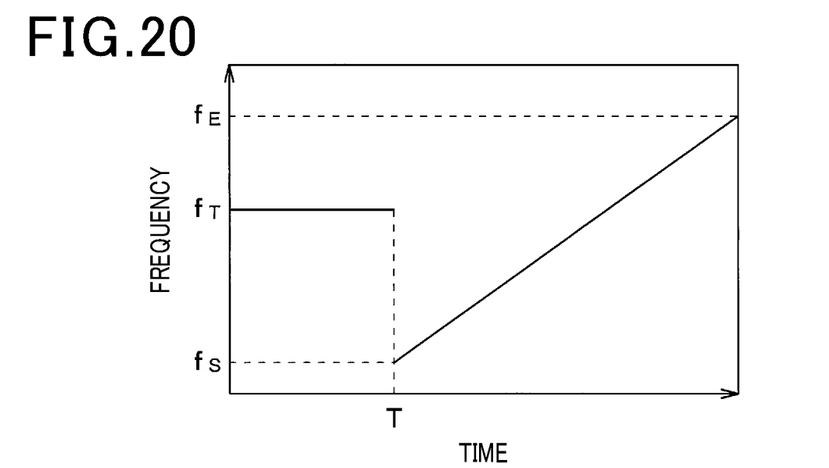
FIG. 20 is an illustration of frequencies of a drive signal with an increased ramp-up signal length.
Figure 21:
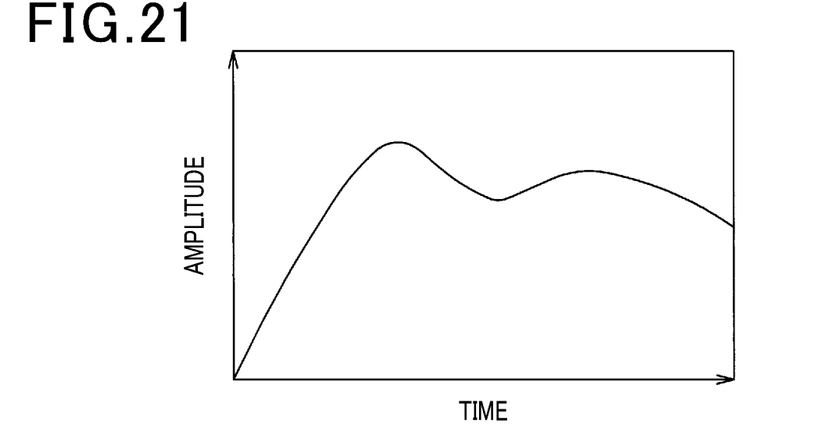
FIG. 21 is an illustration of amplitudes of a received wave when the drive signal of FIG. 20 is used.
Figure 22:
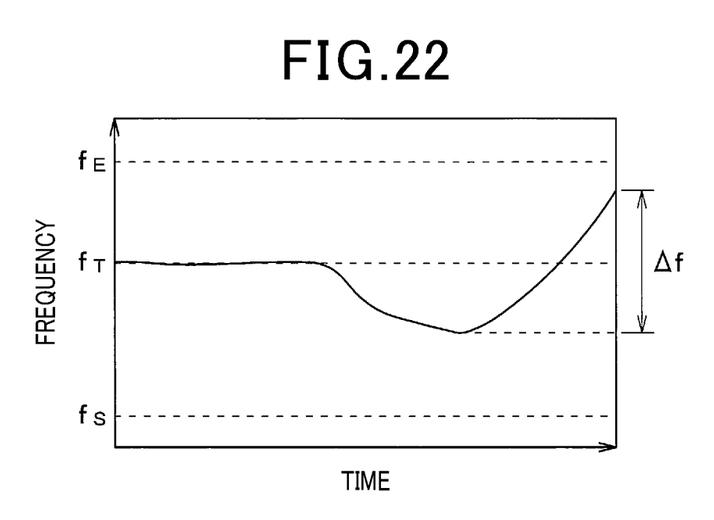
FIG. 22 is an illustration of frequencies of a received wave when the drive signal of FIG. 20 is used.

The signal length of the ramp-up signal may be constant or may be changed depending on situations. However, as illustrated in FIG. 20, the amplitude of the probe wave transmitted in response to the ramp-up signal increases as the time T is increased. Then, as shown in FIG. 21, the probe wave corresponding to the ramp-up signal may overlap with the probe wave corresponding to the identification signal following the ramp-up signal. Thus, as shown in FIG. 22, the width of frequency variation Δf detected from the reception signal becomes smaller than Δf as illustrated in FIG. 9, which may make it difficult to identify the ultrasonic wave. In order to prevent such a situation, it is desirable to decrease the time T. For example, it is desirable to set the time T such that the maximum amplitude of the probe wave transmitted in response to the ramp-up signal is less than the maximum amplitude of the probe wave transmitted in response to the identification signal.

The time T may be changed depending on the characteristics of the identification signal. For example, the time T may differ depending on whether the drive signal illustrated in FIG. 4 is used or the drive signal illustrated in FIG. 5 is used. In cases where the drive signal is generated multiple times in succession, the time T of the second ramp-up signal may be changed from the time T of the first ramp-up signal. Both the frequency $f_T$ and the time T may be changed depending on the characteristics of the identification signal.

The time T may be set such that the amplitude of the probe wave becomes greater than a predetermined value until the end of driving of the transceiving element 30 by the ramp-up signal. For example, prior to shipment of the object detection device, a probe wave may be transmitted from the transceiving element 30 to an object placed at a predetermined distance, and a time required for the amplitude of the reflected wave to exceed the predetermined value may be measured, and this time may be set as the time T.

Either or both of the time T and the frequency $f_T$ may be changed in response to the characteristics variations of either or both of the transmitter 10 and the receiver 50.

Figure 23:
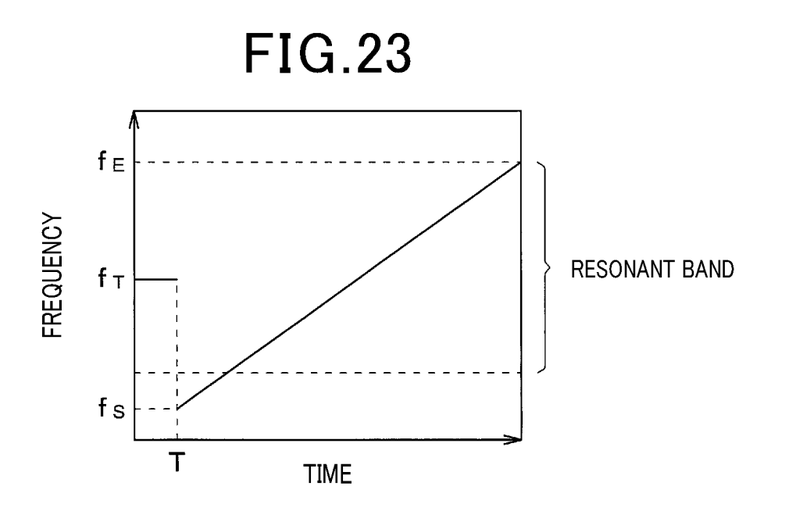
FIG. 23 is an illustration of frequencies of a drive signal according to another embodiment.

The frequency $f_S$ may be set to a value outside the resonant band that enables better reception at the receiver 50. For example, as illustrated in FIG. 23, the frequency $f_S$ may be set to below the resonant band of the identification signal whose frequency increases with time. Alternatively, the frequency $f_S$ may be set to above the resonant band of the identification signal whose frequency decreases with time.

Figure 24:
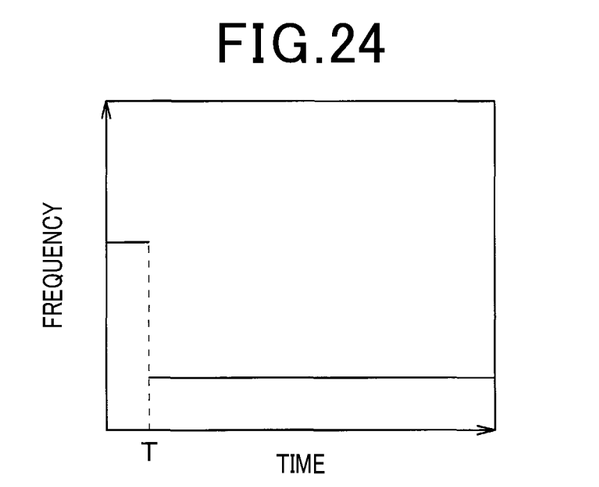
FIG. 24 is an illustration of frequencies of a drive signal according to another embodiment.
Figure 25:
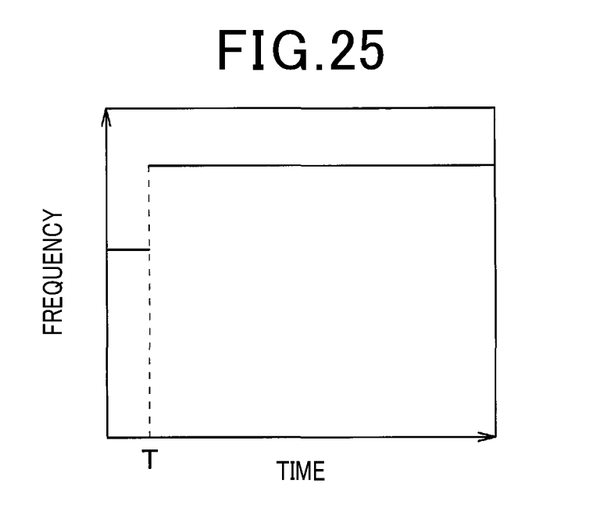
FIG. 25 is an illustration of frequencies of a drive signal according to another embodiment.

The ultrasonic wave may be identified by combining a plurality of identification signals. For example, as illustrated in FIGS. 24 and 25, a drive signal including an identification signal of a fixed frequency lower than the frequency $f_T$ and a drive signal including an identification signal of a fixed frequency higher than the frequency $f_T$ may be combined.

What is claimed is:

1. An object detection device comprising:
   a signal generator configured to generate a drive signal including an identification signal for identifying ultrasonic waves, the identification signal includes a minimum frequency and a maximum frequency, wherein the minimum frequency and the maximum frequency comprise different frequencies;
   a transmitter configured to transmit an ultrasonic wave as a probe wave in response to the drive signal;
   a receiver configured to receive the ultrasonic wave to generate a reception signal; and
   a non-transitory memory storing one or more computer programs; and
   a processor executing the one or more computer programs configured to:
   analyze frequencies of the reception signal to determine whether the received wave is a reflected wave of the probe wave, thereby detecting an object,
   wherein
   the drive signal includes a ramp-up signal generated to be followed by the identification signal and is used to ramp up an amplitude of the probe wave, and
   a frequency of the ramp-up signal is set to include a frequency at which
      a transmission efficiency of the transmitter is higher than a transmission efficiency of the transmitter at each of the maximum frequency of the identification signal and the minimum frequency of the identification signal and/or
      a reception efficiency of the receiver is higher than a reception efficiency of the receiver at each of the maximum frequency of the identification signal and the minimum frequency of the identification signal, and
   the frequency of the ramp-up signal is set to include a frequency between the minimum frequency and the maximum frequency of the identification signal.

2. The object detection device according to claim 1, wherein
   a length of the ramp-up signal is set such that a maximum amplitude of the probe wave transmitted in response to the ramp-up signal is less than a maximum amplitude of the probe wave transmitted in response to the identification signal.

3. The object detection device according to claim 1, wherein
   either or both of a length and the frequency of the ramp-up signal are changed depending on the identification signal.

4. The object detection device according to claim 1, wherein
   either or both of a length and the frequency of the ramp-up signal are changed in response to changes in characteristics of either or both of the transmitter and the receiver.

5. The object detection device according to claim 1, wherein
   either or both of a length and the frequency of the ramp-up signal are changed in response to changes in environmental temperature.

6. The object detection device according to claim 1, wherein
   the frequency of the ramp-up signal stays constant from beginning to end of generation of the ramp-up signal.

7. The object detection device according to claim 1, wherein
   the frequency of the ramp-up signal is a resonant frequency of either or both of the transmitter and the receiver.

8. The object detection device according to claim 1, wherein
   the frequency of the ramp-up signal is a frequency at which either or both of a transmission efficiency of the transmitter and a reception efficiency of the receiver are maximized.

9. The object detection device according to claim 1, wherein
   a length of the ramp-up signal is set such that an amplitude of the probe wave becomes greater than a predetermined value until end of driving of the transmitter by the ramp-up signal.

* * * * *